United States Patent
Byoun et al.

(10) Patent No.: US 7,843,528 B2
(45) Date of Patent: Nov. 30, 2010

(54) BACKLIGHT UNIT AND FLAT PANEL DISPLAY HAVING THE SAME

(75) Inventors: Dae Hyoun Byoun, Seoul (KR); Jun Seok An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 12/172,394

(22) Filed: Jul. 14, 2008

(65) Prior Publication Data
US 2009/0141208 A1   Jun. 4, 2009

(30) Foreign Application Priority Data
Dec. 3, 2007   (KR) .................. 10-2007-0124209

(51) Int. Cl.
*G02F 1/1335* (2006.01)
(52) U.S. Cl. ........................................ 349/69
(58) Field of Classification Search ............... None
See application file for complete search history.

(56) References Cited

U.S. PATENT DOCUMENTS

| 7,360,940 B2* | 4/2008 | Chang et al. ............. 362/631 |
| 2009/0141210 A1* | 6/2009 | Cho et al. .................. 349/64 |
| 2009/0161345 A1* | 6/2009 | Hsu et al. ................. 362/97.2 |
| 2009/0174840 A1* | 7/2009 | Lee et al. ................... 349/67 |
| 2009/0201441 A1* | 8/2009 | Laney et al. ............... 349/64 |
| 2009/0231506 A1* | 9/2009 | Takata ...................... 349/58 |

FOREIGN PATENT DOCUMENTS

| CN | 1851540 | 10/2006 |
| JP | 2004-184493 | 2/2004 |
| KR | 2006-67821 | 6/2006 |

OTHER PUBLICATIONS

Chinese Office Action issued Jan. 15, 2010 in CN Application No. 200810132518.5.

\* cited by examiner

*Primary Examiner*—Sung H Pak
(74) *Attorney, Agent, or Firm*—Stanzione & Kim LLP

(57) ABSTRACT

A flat panel display includes a base chassis, a display panel, a backlight unit connected to the base chassis to emit light to the display panel, and including a substrate mounted with a plurality of light emitting diodes (LEDs) each generating light and a light guide plate disposed between the display panel and the substrate to diffuse the lights generated from the respective LEDs, and a fixing member formed at any one of the base chassis, the substrate, and the light guide plate in order to connect the base chassis with the light guide plate. The base chassis, the substrate and the light guide plate can be conveniently assembled to one another at one time without the use of screws.

17 Claims, 9 Drawing Sheets

BACKLIGHT UNIT AND FLAT PANEL DISPLAY HAVING THE SAME

CROSS-REFERENCE TO RELATED APPLICATIONS

This application claims priority under 35 U.S.C. §119(a) from Korean Patent Application No. 2007-124209, filed on Dec. 3, 2007, in the Korean Intellectual Property Office, the disclosure of which is incorporated herein in its entirety by reference.

BACKGROUND OF THE INVENTION

1. Field of the Invention

The present general inventive concept relates to a flat panel display. More particularly, the present general inventive concept relates to a backlight unit having a point light source, and a flat panel display having the same.

2. Description of the Related Art

Generally, a flat panel display is classified into an emissive display and a non-emissive display. The emissive display, which actively emits light, includes a cathode-ray tube (CRT), a plasma display panel (PDP) and so on. The non-emissive display cannot actively emit light. A liquid crystal display (LCD) is a representative example of the non-emissive display.

The non-emissive flat panel display is able to show an image by receiving light from the outside. Thus, the non-emissive flat panel display needs a backlight unit, besides a display panel, to emit light to the display panel.

The backlight unit is divided into a direct light type and an edge light type according to a mounting position of a light source thereof. In the direct light type, the light source is disposed at a rear side of the display panel, thereby emitting light directly toward the display panel. The light source of the edge light type is disposed at lateral edges of a light guide plate to emit the light toward the display panel through the light guide plate. Since the edge light type is provided only at lateral edges of the display panel, brightness is deteriorated at the center in a wide display panel. For this reason, medium and large sized flat panel displays usually adopt the direct light type.

The light source used for the backlight unit includes a linear light source and a point light source. A cold cathode fluorescent lamp (CCFL) is a typical linear light source. A light emitting diode (LED) is a typical point light source. The CCFL has a large divergence angle and uniform optical patterns. However, the CCFL operated by AC signals requires an inverter and is subject to impact. Alternatively, although the LED does not require the inverter and is impact-resistant, a divergence angle of the LED is relatively smaller than that of the CCFL. With reinforced restrictions of the use of hazardous substances in producing goods, recently, the LED is drawing more attention than the CCFL because of the LCD containing harmful substances such as Hg, Ar and Ne.

FIG. 1 is a sectional view schematically illustrating a conventional non-emissive flat panel display with a backlight unit having a point light source.

As illustrated in FIG. 1, the conventional flat panel display 10 includes a display panel 11 displaying an image or picture therethrough, a backlight unit 12 mounted to a rear side of the display panel 11, and a base chassis 15 mounting various electronic parts and supporting the display panel 11 and the backlight unit 12. In addition, an optical sheet 16 is disposed between the display panel 11 and the backlight unit 12 to uniformly diffuse light emitted from the backlight unit 12 toward the display panel 11.

The backlight unit 12 includes a substrate 13 connected to the base chassis 15, and a plurality of light emitting diodes (LEDs) 14 mounted on the substrate 13. The substrate 13 is fixed to the base chassis 15, for example, by a screw S. The LEDs 14 has a relatively smaller divergence angle than the linear light source such as the CCFL. Therefore, the LEDs 14 are arranged at regular intervals so that the lights from each LED 14 are overlapped with one another.

FIG. 2 schematically shows divergence patterns of the lights generated from the LEDs 14.

Referring to FIGS. 1 and 2, the light of each LED 14 is diverged in a circular pattern and overlapped with the lights of adjacent LEDs 14. Accordingly, brightness decreases moving further away from the LED 14, and a dark spot D occurs at positions where the lights are less overlapping. Thus, when the light from the backlight unit 12 is emitted to the display panel 11 with partial brightness difference, bright lines may occur on a front side of the display panel 11. This problem can be solved, however, only partly by the optical sheet 16 disposed between the display panel 11 and the backlight unit 12.

As described above, in the conventional flat panel display which uses the point light source having a high light convergence and a small divergence angle, bright lines easily occur on the front of the display panel because of difficulty of emitting a uniform flat light to the display panel. Therefore, as well as the optical sheet, a predetermined space between the display panel and the backlight unit needs to be guaranteed in order to prevent occurrence of the bright lines. According to this, however, a thickness of the conventional LED flat panel display should increase compared to the CCFL flat panel display.

In addition, because the backlight unit of the conventional flat panel display is fixed on the base chassis using screws, such assembling is cumbersome. Furthermore, the screws penetrating the backlight unit and protruding backward on the base chasses further increase the thickness of the flat panel display.

SUMMARY OF THE INVENTION

The present general inventive concept provides a backlight unit to emit a flat light uniformly to a display panel and facilitating the assembling thereof, and a flat panel display having the same.

The present general inventive concept also provides a flat panel display having a reduced thickness in comparison with conventional arts.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing provides a flat panel display including a base chassis, a display panel, a backlight unit connected to the base chassis to emit light to the display panel, and including a substrate mounted with a plurality of light emitting diodes (LEDs) each generating light and a light guide plate disposed between the display panel and the substrate to diffuse the lights generated from the respective LEDs, and a fixing member formed at any one of the base chassis, the substrate, and the light guide plate in order to connect the base chassis with the light guide plate.

The fixing member may include fixing projections formed on any one of the base chassis, the substrate, and the light guide plate to protrude toward the other two of the base chassis, the substrate, and the light guide plate, and the other two each include corresponding fixing holes to insert the fixing projections therein.

The fixing projection may be formed on one surface of the light guide plate while the fixing holes are formed on the base chassis and the substrate.

The light guide plate may include a plurality of light guide projections corresponding to the plurality of LEDs to diffuse the lights generated from the LEDs.

The light guide projection may include a receiving recess formed on a rear surface thereof to receive the LED.

The foregoing and/or other aspects and utilities of the general inventive concept may also be achieved by providing a backlight unit usable with a base chassis to emit light to a display panel, the backlight unit including a substrate mounted with a plurality of LEDs each generating light, a light guide plate disposed between the display panel and the substrate to diffuse the lights generated from the LEDs, and a fixing member formed at any one of the substrate and the light guide plate in order to connect the light guide plate with the base chassis.

The fixing member may include fixing projections protruding toward the other one of the substrate and the light guide plate, without the fixing member, and the other one includes corresponding fixing holes to insert the fixing projections therein.

The fixing projection may be formed on one surface of the light guide plate while the fixing holes are formed on the substrate.

The foregoing and/or other aspects and utilities of the general inventive concept may be achieved by providing a backlight unit usable with a flat panel display, the backlight unit including a substrate mounted with a plurality of light emitting diodes (LEDs) to generate light, a light guide unit including a light guide plate having a plurality of light guide projections to diffuse the light generated by the LEDS and at least one of a set of fixing projections and a set of corresponding fixing holes, wherein the flat panel display and substrate include the other of the set of fixing projections and the set of corresponding fixing holes to engage the one of the set of fixing projections and the set of fixing holes of the light guide unit.

The light guide unit may include the set of fixing projections and the flat panel display and the substrate may include the set of corresponding fixing holes.

The flat panel display unit may include the set of fixing projections and the substrate and the light guide unit may include the set of corresponding fixing holes.

The substrate may include the set of fixing projections and the flat panel display and the light guide unit may include the set of corresponding fixing holes.

The foregoing and/or other aspects and utilities of the general inventive concept may also be achieved by providing a flat panel display including a base chassis, and a backlight unit to connect to the base chassis, the backlight unit including a substrate mounted with a plurality of light emitting diodes (LEDs) to generate light, a light guide unit including a light guide plate having a plurality of light guide projections to diffuse the light generated by the LEDS and at least one of a set of fixing projections and a set of corresponding fixing holes, wherein the base chassis and substrate include the other of the set of fixing projections and the set of corresponding fixing holes to engage the one of the set of fixing projections and the set of fixing holes of the light guide unit.

BRIEF DESCRIPTION OF THE DRAWINGS

These and/or other aspects and utilities of the exemplary embodiments of the general inventive concept will become apparent and more readily appreciated from the following description of the embodiments, taken in conjunction with the accompanying drawings, of which.

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
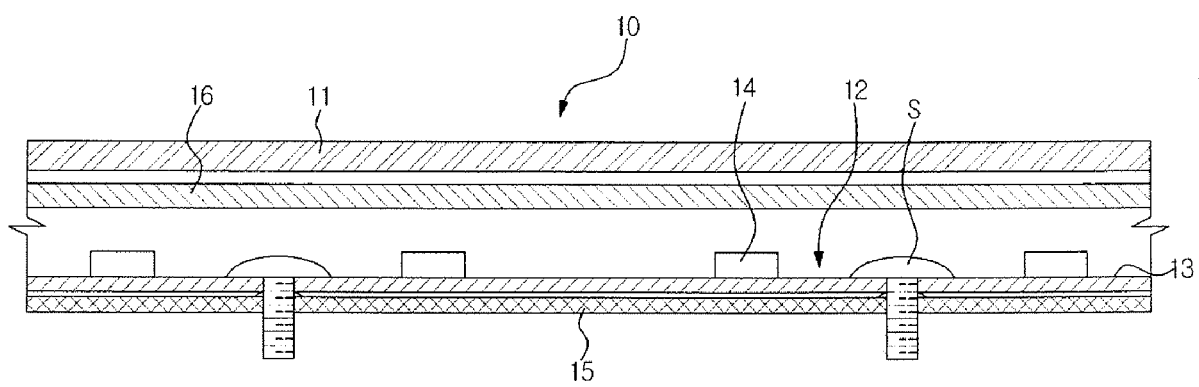
FIG. 1 is a sectional view schematically illustrating a conventional non-emissive flat panel display with a backlight unit having a point light source.
Figure 2:
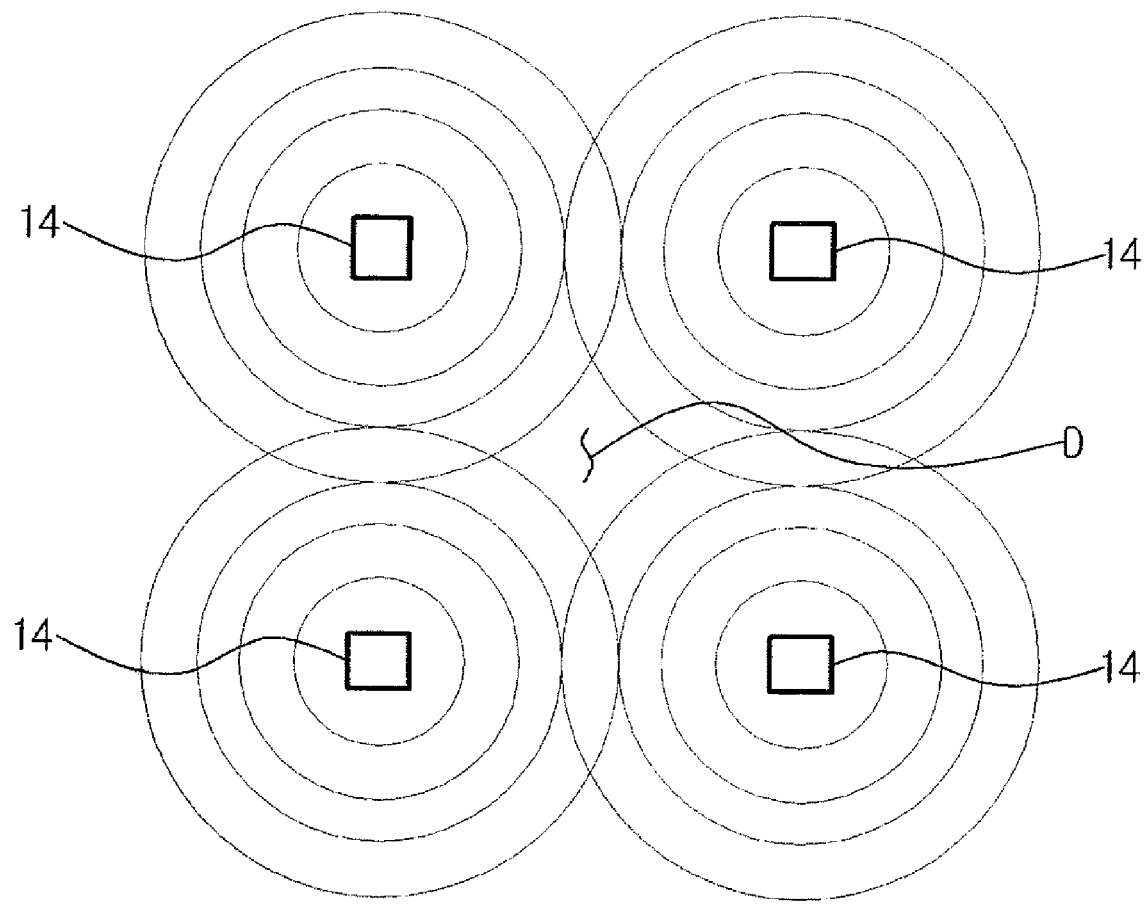
FIG. 2 is a plan view schematically illustrating divergence patterns of light generated from a backlight unit of the conventional flat panel display of FIG. 1.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 3:
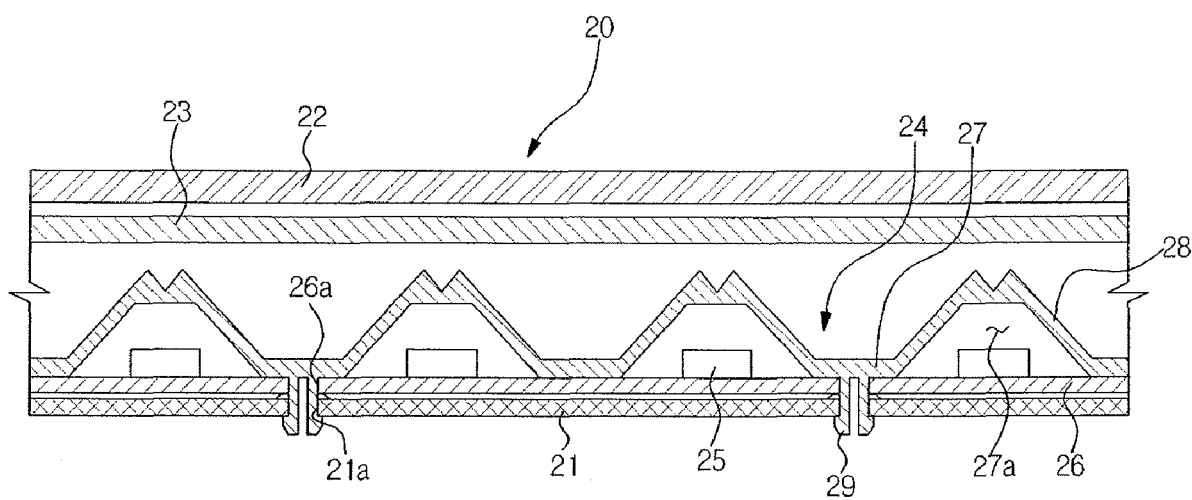
FIG. 3 is a sectional view schematically illustrating a flat panel display according to an embodiment of the present general inventive concept.

As illustrated in FIG. 3, a flat panel display 20 according to an embodiment of the present general inventive concept includes a base chassis 21, a display panel 22, an optical sheet 23 mounted to a rear side of the display panel 22, and a backlight unit 24 connected with the base chassis 21 to emit light to the display panel 22.

Various electronic parts including the backlight unit 24 are mounted to the base chassis 21. Also, the base chassis 21 supports the display panel 22 and the optical sheet 23. Since being generally known in the art, a connection structure among the base chassis 21, the display panel 22 and the optical sheet 23 will not be described herein in detail. The base chassis 21 includes a plurality of fixing holes 21a.

The display panel 22 which displays pictures or images therethrough may be implemented by a liquid crystal display (LCD) panel displaying the image by receiving image signals, or a transparent or translucent panel printed with pictures.

The optical sheet 23 diffuses the light emitted from the backlight unit 24 so that the light is incident uniformly to a rear surface of the display panel 22. Although a single optical sheet 23 is provided between the display panel 22 and the backlight unit 24 in the drawing, the present embodiment does not specifically limit a number of the optical sheets 23 used.

Figure 4:
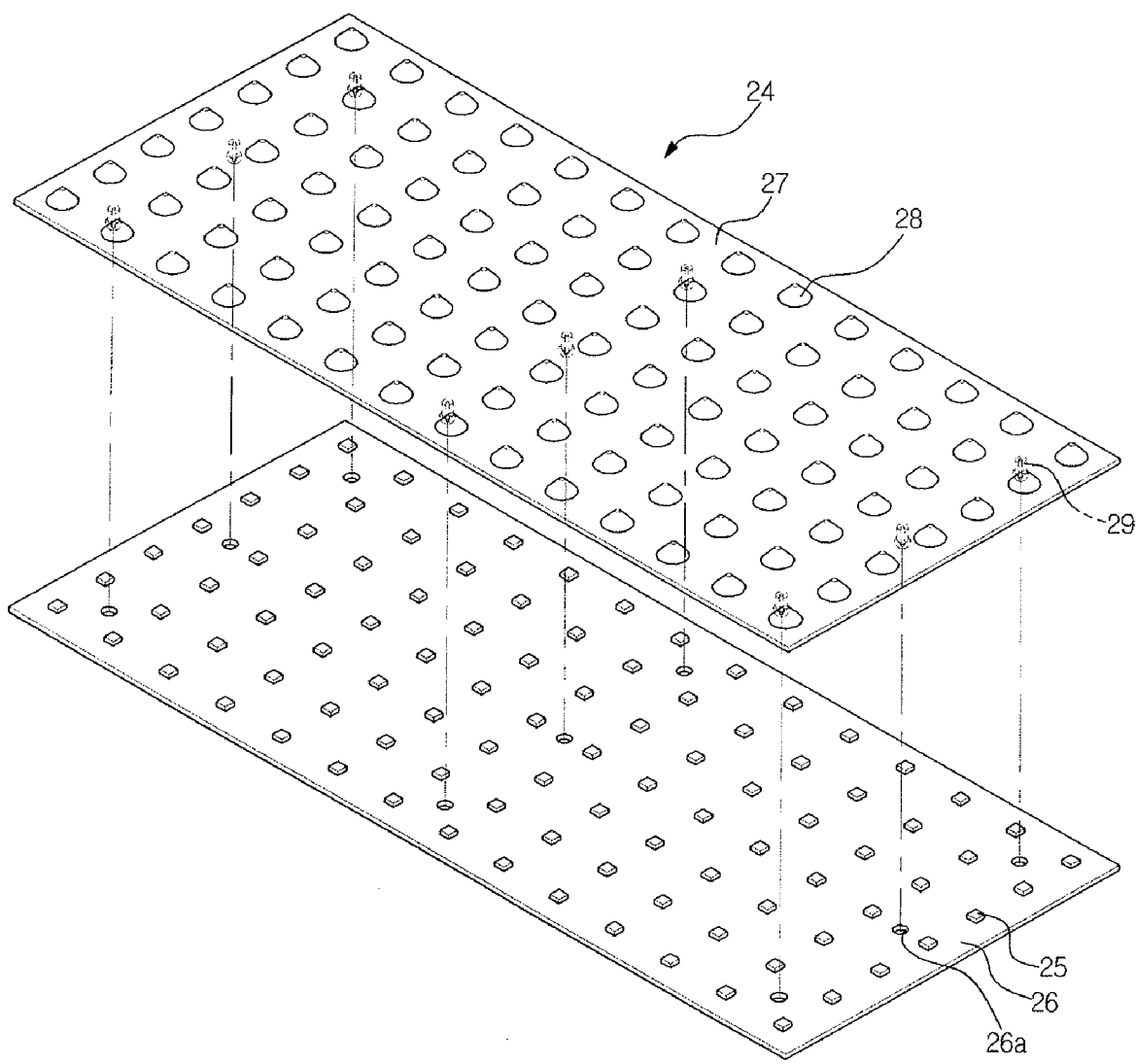
FIG. 4 is an exploded perspective view schematically illustrating a backlight unit of the flat panel display of FIG. 3.

The backlight unit 24 is connected to the base chassis 21 so as to emit light to the rear surface of the display panel 22. As illustrated in FIGS. 3 and 4, the backlight unit 24 includes a substrate 26 on which a plurality of light emitting diodes (LEDs) 25 are arranged at regular intervals, being directed to the display panel 22. The backlight unit 24 also includes a light guide plate 27 disposed between the substrate 26 and the display panel 22. The backlight unit 24 may have a size corresponding to the display panel 22 or smaller than the display panel 22. In case of the latter, a plurality of the backlight units 24 are mounted at the rear side of the display panel 22.

The substrate 26 is connected to a front side of the base chassis 21 and includes a plurality of fixing holes 26a corresponding to the fixing holes 21a of the base chassis 21. A plurality of LEDs 25 are arranged at regular intervals on the front surface of the substrate 26. Conducting wires (not illustrated) may be additionally provided at the rear surface or an inside of the substrate 26 in order to supply electric current to the plurality of LEDs 25. Here, the LED 25 is a point light source to emit light by receiving the electric current.

The light guide plate 27 diffuses the light generated from each LED 25 such that the lights of the respective LEDs 25 can be emitted to the display panel 22 uniformly in a form of a flat light. Since the LED 25, which is the point light source, has a small divergence angle, if the LEDs 25 and the display panel 22 are not spaced apart enough from each other, the brightness of the light incident to the display panel 22 is varied according to the distance to the LED 25. Such a brightness difference of the incident light causes bright lines on the front side of the display panel 22. Thus, the light guide plate 27 is provided to reduce the brightness difference of the incident light, by diffusing the lights from the respective LED 25 into a uniform flat light.

Figure 5:
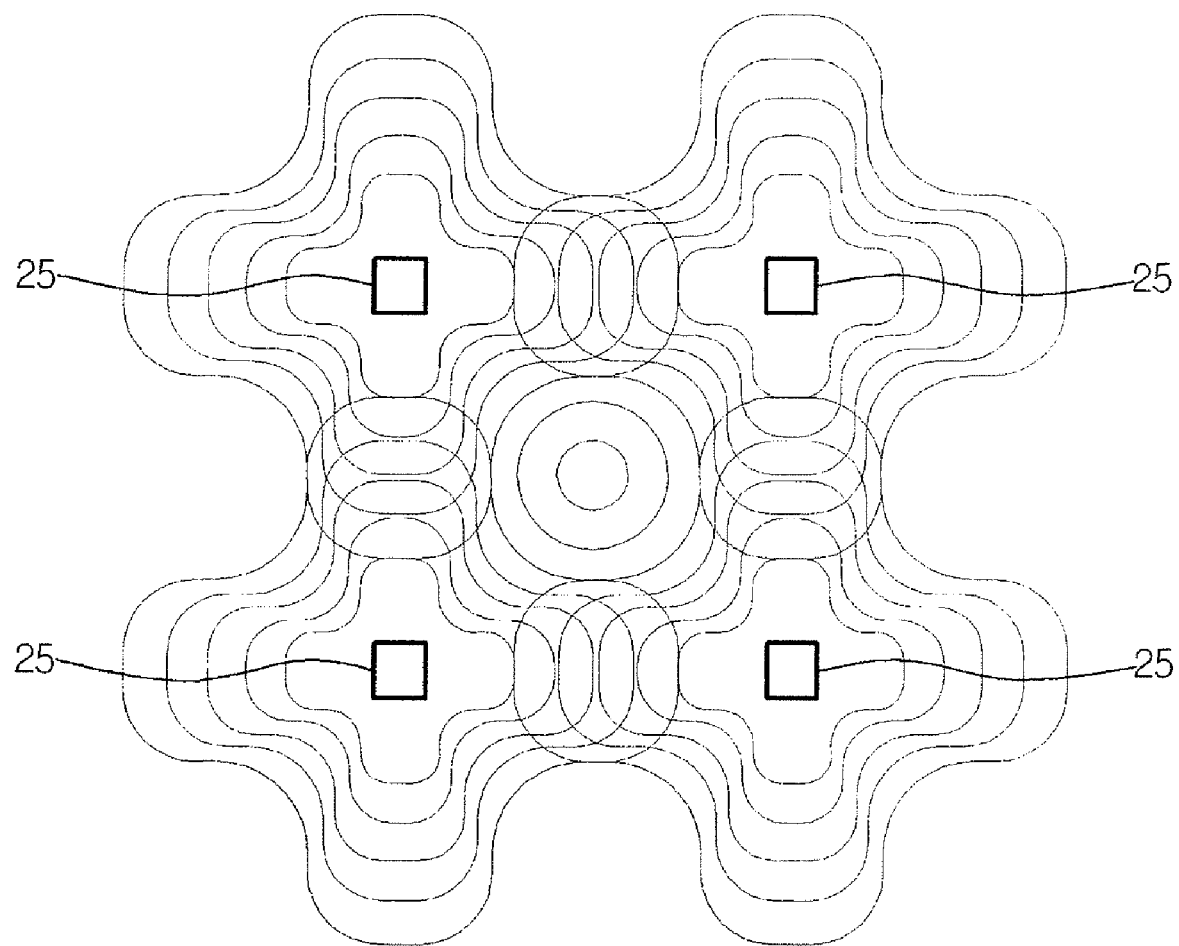
FIG. 5 is a plan view schematically illustrating divergence patterns of light generated from the backlight unit illustrated in FIG. 4.

The light guide plate 27 may have a size corresponding to the substrate 26 and connected to the front side of the substrate 26. A plurality of light guide projections 28 corresponding to the plurality of LEDs 25 are formed on a front surface of the light guide plate 27. The light guide projections 28 diffuse the lights generated from the LEDs 25 by a predetermined pattern so that light of one LED 25 and light of another LED 25 adjacent to the one LED 25 overlap each other by a greater degree as illustrated in FIG. 5. Accordingly, the brightness difference between positions at different distances to the LED 25 can be reduced, thereby restraining an occurrence of a dark spot between respective two adjacent LEDs 25. Although the brightness difference partially occurs with the light passed through the light guide plate 27, the brightness difference is further reduced as the light passes through the optical sheet 23. As a result, the bright lines may not be seen on the front side of the display panel 22.

A receiving recess 27a is formed on a rear surface of each of the light guide projections 28 to receive the LED 25. When the light guide plate 27 is connected to the substrate 26, the LEDs 25 are received in the respective corresponding receiving recesses 27a as illustrated in FIG. 3.

Figure 6:
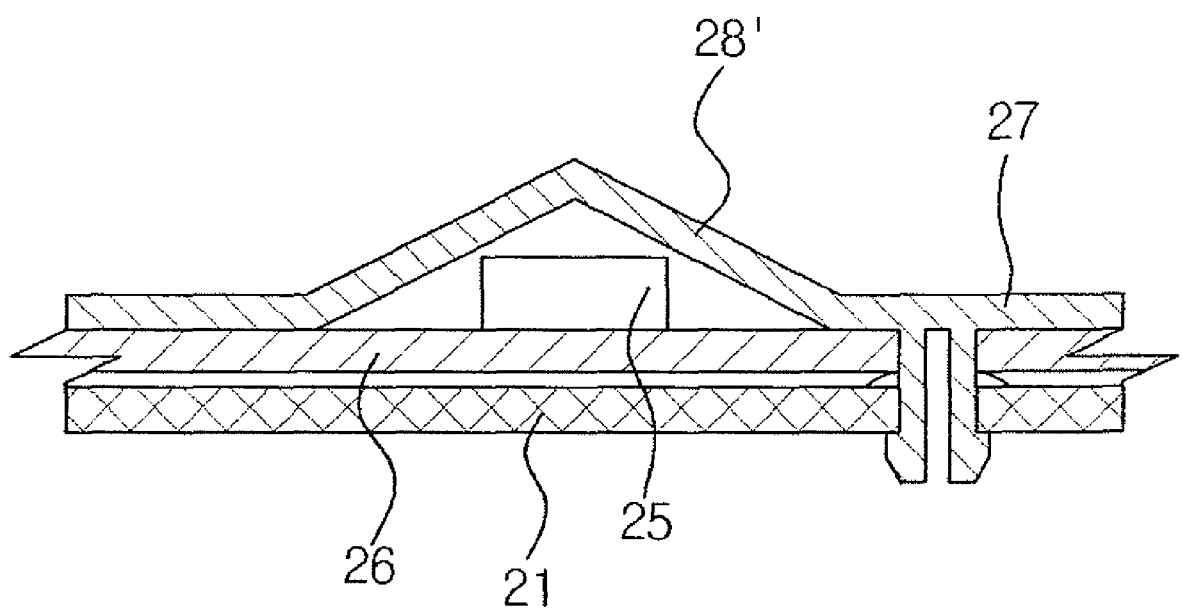
FIG. 6 and FIG. 7 are sectional views illustrating various forms of light guide projections provided to a light guide plate of the flat panel display according to an embodiment of the present general inventive concept.
Figure 7:
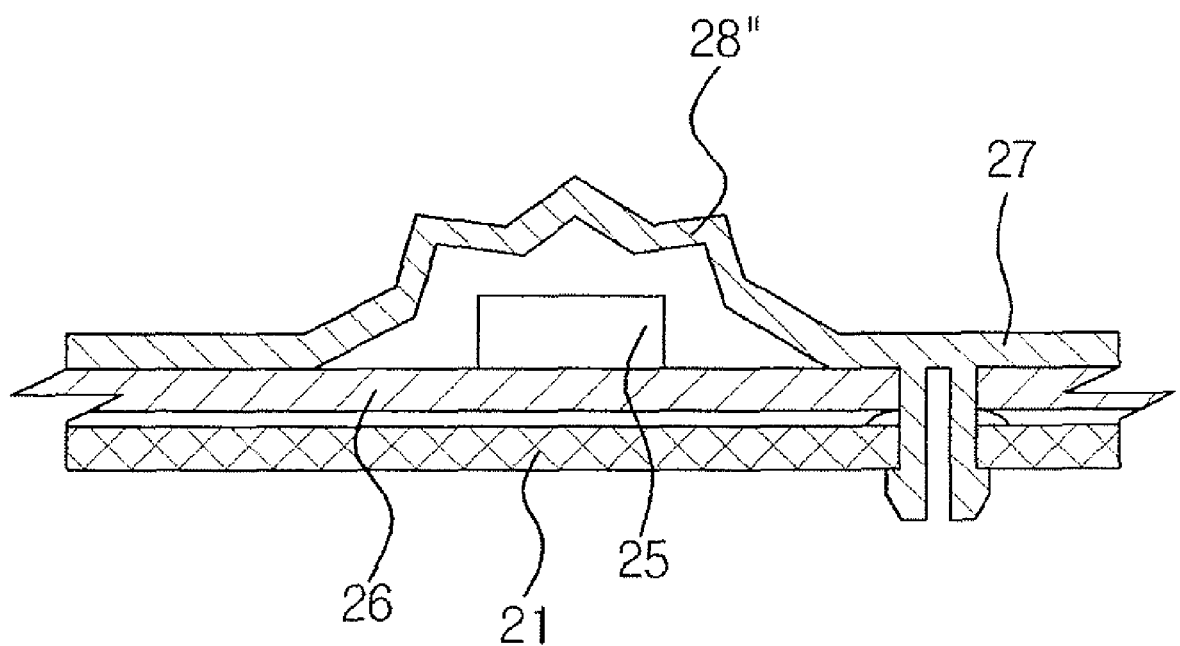

In the present embodiment of the present general inventive concept, a shape of the light guide projection 28 is not limited to a cone with a depressed central top as illustrated in FIGS. 3 and 4. FIGS. 6 and 7 show various forms of the light guide projection. In FIG. 6, more specifically, a light guide projection 28' has a conical shape rather protruding toward the display panel 22 (FIG. 3). A light guide projection 28" illustrated in FIG. 7 has a conical shape having a double protruding structure toward the display panel 22. Besides the illustrated shapes, other various shapes may be applied to the light guide projection.

Referring to FIG. 3, the plurality of fixing projections 29 are formed on the rear surface of the light guide plate 27 corresponding to the fixing holes 21a of the base chassis 21 and the fixing holes 26a of the substrate 26. The plurality of fixing projections 29 function as fixing members to connect the light guide plate 27 and the substrate 26 together to the base chassis 21. More particularly, as the plurality of fixing projections 29 are passed through the fixing holes 26a of the substrate 26 and inserted in the fixing holes 21a of the base chassis 21, the substrate 26 and the light guide plate 27 can be connected sequentially onto the base chassis 21. The fixing projections 29 have a flanged end so as not to easily unintentionally separate from the fixing holes 21a of the base chassis 21 after being inserted in the fixing holes 21a.

In the flat panel display 20 according to the above embodiment, connection between the backlight unit 24 and the base chassis 21 is achieved by inserting the fixing projections 29 of the light guide plate 27 in the fixing holes 26a and the fixing holes 21a sequentially. By thus omitting screws conventionally used, the assembling can be highly facilitated.

In addition, in the flat panel display 20, since the lights generated from the LEDs 25 are diffused by the light guide plate 27 to be more uniform, an occurrence of the bright lines on the display panel 22 can be prevented although the distance between the display panel 22 and the plurality of LEDs 25 is reduced. Consequently, the thickness of the flat panel display 20 can be reduced.

Figure 8:
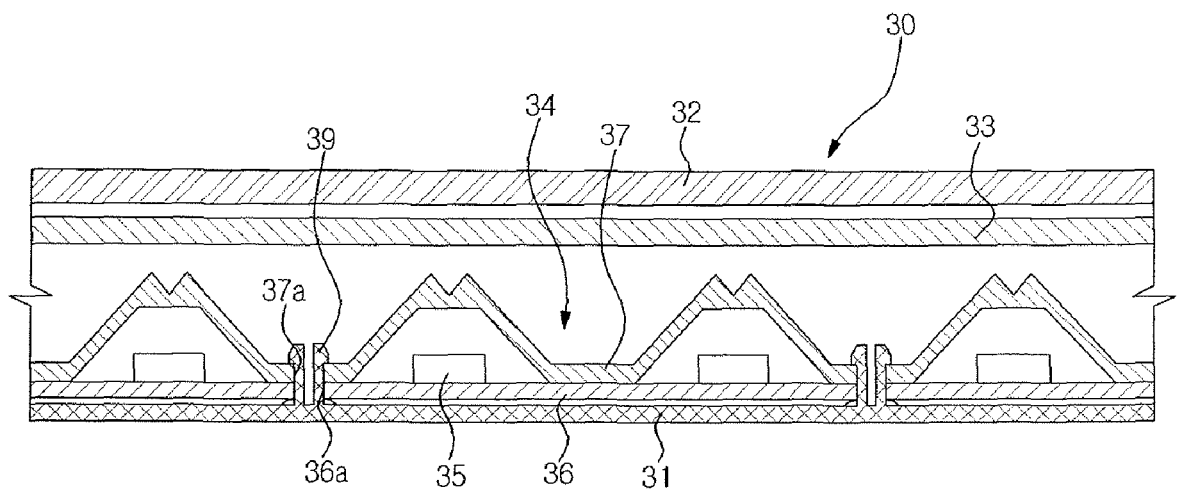
FIG. 8 is a sectional view schematically illustrating a flat panel display according to another embodiment of the present general inventive concept.

FIG. 8 is a side sectional view illustrating a flat panel display 30 according to another embodiment of the present general inventive concept.

Referring to FIG. 8, the flat panel display 30 includes a base chassis 31, a display panel 32, an optical sheet 33 mounted at a rear side of the display panel 32, and a backlight unit 34 connected to the base chassis 31 to emit light to the display panel 32. The backlight unit 34 includes a substrate 36 on which a plurality of LEDs 35 are mounted at regular intervals, and a light guide plate 37 connected to the substrate 36 to cover the LEDs 35.

The only difference of the flat panel display 30 illustrated in FIG. 8 from the flat panel display 20 illustrated in FIG. 3 is in a fixing member to connect the base chassis 31, the substrate 36 and the light guide plate 37 at one time. The other structures of the flat panel display 30 are the same as those of the flat panel display 20 of the embodiment illustrated in FIG. 3.

A plurality of fixing projections 39 are formed on a front surface of the base chassis 31. A plurality of fixing holes 36a and 37a are formed on the substrate 36 and the light guide plate 37 respectively, corresponding to the fixing projections 39. The substrate 36 and the light guide plate 37 are placed on the front surface of the base chassis 31 in sequence. As the fixing projections 39 penetrate the fixing holes 36a of the substrate 36 and are inserted in the fixing holes 37a of the light guide plate 37, the base chassis 31, the substrate 36 and the light guide plate 37 are connected to one another at one time. Thus, the assembling of the flat panel display 30 is more facilitated than the conventional flat panel display assembled using screws.

In addition, in the flat panel display 30 of the present embodiment, the light guide plate 37 diffuses the lights generated from the LEDs 35 into a more uniform light. Therefore, although the distance between the display panel 32 and the LEDs 35 is reduced, bright lines do not occur on the front side of the display panel 32. Consequently, the thickness of the flat panel display 30 is able to have a reduced thickness compared to the conventional flat panel display.

Figure 9:
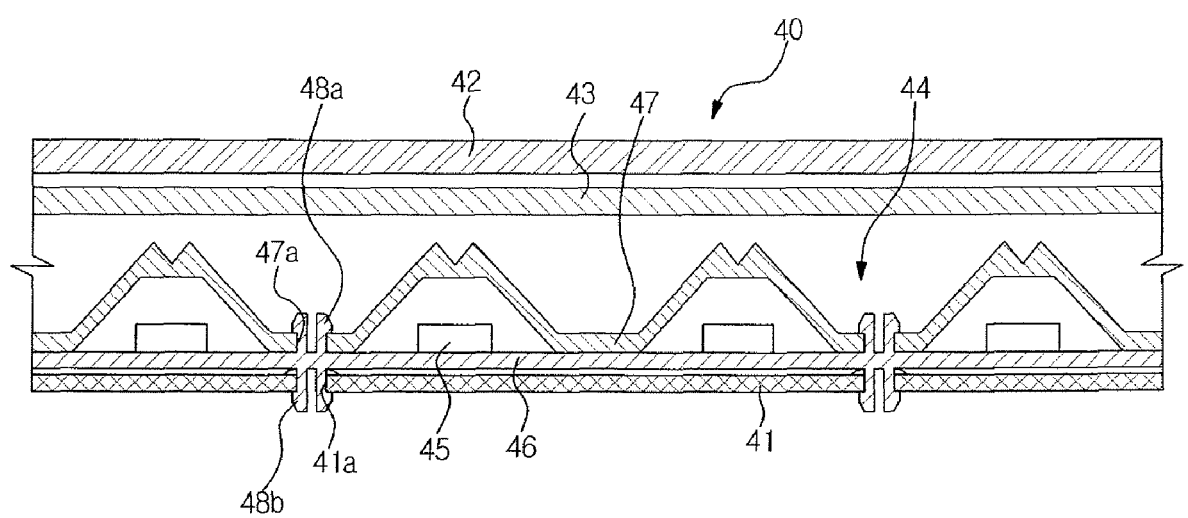
FIG. 9 is a sectional view schematically illustrating a flat panel display according to yet another embodiment of the present general inventive concept.

FIG. 9 is a sectional view of a flat panel display 40 according to yet another embodiment of the present general inventive concept. The flat panel display 40 includes a base chassis 41, a display panel 42, an optical sheet 43 mounted at a rear side of the display panel 42, and a backlight unit 44 connected to the base chassis 41 to emit light toward the display panel 42. The backlight unit 44 includes a substrate 46 on which a plurality of LEDs 45 are mounted at regular intervals, and a light guide plate 47 connected to the substrate 46 to cover the LEDs 45.

In the same manner as the flat panel display 30 of FIG. 8, the flat panel display 40 is distinctive from the flat panel display 20 only in terms of a fixing member to connect the base chassis 41, the substrate 46, and the light guide plate 47 at one time. The other structures are the same between the flat panel display 40 illustrated in FIG. 9 and the flat panel display 20 illustrated in FIG. 3.

A plurality of fixing projections 48a and 48b are protruded on the front and the rear surfaces of the substrate 46, respectively. The fixing projections 48a and 48b include first projections 48a for connection with the light guide plate 47, and second projections 48b for connection with the base chassis 41. The light guide plate 47 includes a plurality of fixing holes 47a corresponding to the first projections 48a while the base chassis 41 includes a plurality of fixing holes 41a corresponding to the second projections 48b. As the first projections 48a of the substrate 46 are inserted in the fixing holes 47a of the light guide plate 47 and the second projections 48b in the fixing holes 41a of the base chassis 41, the base chassis 41, the substrate 46 and the light guide plate 47 can be connected to one another at one time.

The above-structured flat panel display 40, has also the same advantage as the flat panel displays 20 and 30 of the two preceding embodiments, can be assembled more efficiently than the conventional flat panel display, and compacted by reducing the distance between the display panel 42 and the LEDs 45 due to the light guide plate 47 uniformly diffusing the lights from the LEDs 45.

The flat panel display according to various embodiments of the present general inventive concept is applicable to an LCD device to display images according to image signals, and an advertisement board displaying a still image.

As described above, in the flat panel display according to the various embodiments of the present general inventive concept, assembling of the base chassis, the substrate, and the light guide plate can be conveniently performed at one time by the respective fastening system thereof.

Moreover, the light guide plate mounted between the display panel and a plurality of the LEDs diffuses the lights from the LEDs uniformly. Accordingly, the thickness of the flat panel display can be reduced.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A flat panel display, comprising:
   a base chassis;
   a display panel;
   a backlight unit connected to the base chassis to emit light to the display panel, and including a substrate mounted with a plurality of light emitting diodes (LEDs) each generating light and a light guide plate having a plurality of light guide projections corresponding to the plurality of LEDs disposed between the display panel and the substrate to diffuse the lights generated from the respective LEDs; and
   a fixing member formed at any one of the base chassis, the substrate, and the light guide plate in order to connect the base chassis with the light guide plate in between the plurality of light guide projections.

2. The flat panel display according to claim 1, wherein the fixing member comprises fixing projections formed on any one of the base chassis, the substrate, and the light guide plate to protrude toward the other two of the base chassis, the substrate, and the light guide plate, and the other two each include corresponding fixing holes to insert the fixing projections therein.

3. The flat panel display according to claim 2, wherein the fixing projection is formed on one surface of the light guide plate and the fixing holes are formed on the base chassis and the substrate.

4. The flat panel display according to claim 1, wherein the light guide projection comprises:
   a receiving recess formed on a rear surface thereof to receive the LED.

5. A backlight unit usable with a base chassis to emit light to a display panel, the backlight unit comprising:
   a substrate mounted with a plurality of LEDs each generating light;
   a light guide plate having a plurality of light guide projections corresponding to the plurality of LEDs disposed between the display panel and the substrate to diffuse the lights generated from the LEDs; and
   a fixing member formed at any one of the substrate and the light guide plate in order to connect the light guide plate with the base chassis in between the plurality of light guide projections.

6. The backlight unit according to claim 5, wherein the fixing member comprises fixing projections protruding toward the other one of the substrate and the light guide plate, without the fixing member, and the other one includes corresponding fixing holes to insert the fixing projections therein.

7. The backlight unit according to claim 6, wherein the fixing projection is formed on one surface of the light guide plate and the fixing holes are formed on the substrate.

8. The backlight unit according to claim 5, wherein the light guide projection comprises:
   a receiving recess formed on a rear surface thereof to receive the LED.

9. A backlight unit usable with a flat panel display, the backlight unit comprising:
   a substrate mounted with a plurality of light emitting diodes (LEDs) to generate light;
   a light guide unit including a light guide plate having a plurality of light guide projections to diffuse the light generated by the LEDS and at least one of a set of fixing projections and a set of corresponding fixing holes disposed in between the plurality of light guide projections, wherein the flat panel display corn rises a base chassis which is disposed at a rear surface of the substrate, and the base chassis and the substrate include the other of the set of fixing projections and the set of corresponding fixing holes to engage the one of the set of fixing projections and the set of fixing holes of the light guide unit.

10. The backlight unit according to claim 9, wherein the light guide unit includes the set of fixing projections, and the base chassis and the substrate include the set of corresponding fixing holes.

11. The backlight unit according to claim 9, wherein the flat base chassis includes the set of fixing projections, and the substrate and the light guide unit include the set of corresponding fixing holes.

12. The backlight unit according to claim 9, wherein the substrate includes the set of fixing projections, and the base chassis and the light guide unit include the set of corresponding fixing holes.

13. A flat panel display, comprising:
a base chassis; and
a backlight unit to connect to the base chassis, the backlight unit comprising:
a substrate mounted with a plurality of light emitting diodes (LEDs) to generate light; and
a light guide unit including a light guide plate having a plurality of light guide projections to diffuse the light generated by the LEDS and at least one of a set of fixing projections and a set of corresponding fixing holes,
wherein the base chassis and substrate include the other of the set of fixing projections and the set of corresponding fixing holes to engage the one of the set of fixing projections and the set of fixing holes of the light guide unit, and
wherein the at least one set of fixing projections and the set of corresponding fixing holes are disposed in between the plurality of light guide projections.

14. A backlight unit usable with a flat panel display, comprising:
a substrate having a plurality of light emitting diodes (LEDs) disposed on a surface thereof and at least one fixing hole disposed between at least two LEDs of the plurality of LEDs; and
a light guide plate comprising a light guide projection corresponding to each LED and a fixing projection corresponding to the at least one fixing hole to secure the light guide plate to the substrate.

15. The backlight unit of claim 14, wherein the LEDs are arranged at regular intervals on a front surface of the substrate.

16. The backlight unit of claim 15, further comprising a cavity defined by the light guide projection and the front surface of the substrate to maintain a distance between the LEDs and the light guide projection.

17. A backlight unit usable with a display panel, comprising:
a substrate having opposing first and second surfaces, a plurality of light emitting diodes (LEDs) disposed on the first surface, and first and second fixing projections to extend from the first and second surfaces, respectively;
a light guide plate comprising a light guide projection corresponding to each LED and a first fixing hole disposed between at least two LEDs and corresponding to the first fixing projection to secure the light guide plate to the substrate; and
a base chassis having a second fixing hole corresponding to the second fixing projection to secure the base chassis to the light guide plate.

* * * * *